United States Patent
Suzuki

[11] Patent Number: 6,053,097
[45] Date of Patent: Apr. 25, 2000

[54] RICE TUB-SHAPED SUSHI BALL-FORMING APPARATUS

[76] Inventor: Kisaku Suzuki, 2-Chome 3-15, Shinju-ku, Tokyo, Japan

[21] Appl. No.: 09/366,801

[22] Filed: Aug. 4, 1999

[51] Int. Cl.[7] .............................. A21C 3/06; A21C 9/00; A23P 1/00; A47J 43/20

[52] U.S. Cl. ...................... 99/450.2; 99/450.1; 99/450.6; 425/110; 425/112; 425/308

[58] Field of Search ............... 99/485, 353, 428, 99/450.1, 450.2, 450.5, 450.6, 450.7; 425/182, 225, 193, 204, 358, 297, 408, 327, 412, 308, 383, 110, 112, 315; 426/272, 512, 513

[56] References Cited

U.S. PATENT DOCUMENTS

| | | | |
|---|---|---|---|
| 4,437,826 | 3/1984 | Tezuka | 425/308 X |
| 4,548,571 | 10/1985 | Suzuki | 99/450.1 X |
| 4,552,523 | 11/1985 | Suzuki | 99/485 X |
| 4,556,379 | 12/1985 | Ikishima | 425/308 X |
| 4,597,731 | 7/1986 | Suzuki | 426/512 X |
| 4,637,304 | 1/1987 | Suzuki | 99/450.2 |
| 4,674,967 | 6/1987 | Oseka | 99/450.1 X |
| 5,381,728 | 1/1995 | Tateno | 425/112 X |
| 5,482,453 | 1/1996 | Shimizu | 426/512 X |
| 5,634,396 | 6/1997 | Isobe et al. | 99/450.6 |
| 5,832,813 | 11/1998 | Shimazu | 99/450.2 |
| 5,870,948 | 2/1999 | Ono | 99/450.2 X |
| 5,910,208 | 6/1999 | Ono | 99/353 |

Primary Examiner—Timothy Simone
Attorney, Agent, or Firm—Lowe Hauptman Gopstein Gilman & Berner

[57] ABSTRACT

A rice tub-shaped sushi ball-forming apparatus comprises a rice tub-shaped container (1) and a sushi ball-forming mechanism A. The sushi ball-forming mechanism A includes a conveying mechanism (13) disposed in a hopper in the rice tub-shaped container (1), for conveying sushi rice (a) from an inside of the hopper, a compression-conveying mechanism (29) for pushing up and compression-conveying the sushi rice (a) supplied from the hopper, from a lower portion to an upper portion of the container, a compression-forming mechanism (33) for compression-forming the sushi rice (a) pushed up and compression-conveyed by the compression-conveying mechanism (29), into a predetermined shape through a forming hole (33b), and a cutting mechanism (35) for cutting an upper end ($a_2$) of the sushi rice compression-formed through the forming hole (33b) in a predetermined amount (length) to produce a sushi ball ($a_3$) having a predetermined shape, size, and hardness.

6 Claims, 7 Drawing Sheets

RICE TUB-SHAPED SUSHI BALL-FORMING APPARATUS

BACKGROUND OF THE INVENTION

1. Field of the Invention

The present invention relates to a rice tub-shaped sushi ball-forming apparatus which is capable of automatically forming sushi balls each having a predetermined shape, size, and hardness before making e.g. hand-shaped sushi, and rice balls sideways surrounded in laver, called "Gunkan-maki".

2. Prior Art

Conventionally, sushi artisans make hand-shaped sushi called "Edo-style" by hand-shaping sushi rice into a bite-sized sushi ball, putting grated wasabi and a sliced fish or other dilicacies on a top of the sushi ball, and then hand-shaping them again using the palm of his hand and his fingers.

Making the hand-shaped sushi counting on the skill of the artisans as described above increases the producing cost.

Therefore, the recent shortage of the artisans and requirement of lowering the producing cost, etc. cause machines of automatically producing sushi balls, the so-called sushi robot, to be developed, which are now used in sushi shops or restaurants.

However, customers have a tendency of still desiring no mechanization, which is the main reason why the sushi robots are prevented from being further widespread.

The solution to this problem lies in producing a lot of sushi balls using a sushi robot located at a place where it cannot be seen by the customers, and then bringing the sushi balls in the sushi shops using stockers, etc. This requires, however, a lot of time until making of hand-shaped sushi after forming of sushi balls, which provides a problem of e.g. deteriorating of the quality.

Therefore, there is proposed a sushi robot which weighs out the required amount of sushi rice by a weighing out apparatus from a sushi rice container arranged below a top plate of a cabinet, placing the weighed out sushi rice on a lower mold on a turntable, compressing the sushi rice with not only the lower mold but also an upper mold to make a sushi ball having a predetermined shape and size, shift the sushi ball on a conveying means comprising a belt conveyer by a seizing apparatus and a moving apparatus, and then conveying the sushi ball to an opening portion disposed on the top plate by the conveying means.

According to thus constructed sushi robot, a sushi tub, opening at a bottom, is arranged on the opening portion of the top plate; therefore, even if an amateur, having no experience of making hand-shaped sushi, makes the hand-shaped sushi, the customers to be impressed as if the sushi artisan took out the sushi rice from the sushi tub.

However, the above-mentioned sushi robot is so constructed to carry out by stages weighing out of the sushi rice, forming of the sushi balls, and moving of the sushi balls, and convey the sushi balls formed at its lower portion to its upper portion specially by means of the belt conveyer, thereby making the construction complicated, and further increasing the size, which requires a large installation space. This makes it impossible to install the sushi robot in a narrow counter of e.g. sushi shops.

Moreover, when moving the sushi balls while seizing and lifting them by the moving means, and when conveying the sushi balls from the lower portion to the upper portion by the belt conveyer, the sushi balls are liable to lose their shape, which provides a problem of requiring to hand-shaping the sushi ball again to waste labor and time.

SUMMARY OF THE INVENTION

The present invention has been made in view of the above problems of the prior art. It is therefore an object of the present invention to provide a rice tub-shaped sushi ball-forming apparatus in which all mechanisms are arranged inside a rice tub-shaped container while being combined in a rational manner, thereby miniaturizing the apparatus, facilitating the transfer and conveyance of the apparatus, and enabling the apparatus to be used in a narrow space, which enables the sushi balls to be taken out through a taking out portion of an upper portion of the rice tub-shaped container on forming the sushi balls to thereby preventing the sushi balls from losing their shape, and enables an amateur, having no experience of making hand-shaped sushi, to take out the sushi balls from the rice tub-shaped container as if it were a sushi artisan in appearance.

To attain the above-object, the present invention provides a rice tub-shaped sushi ball-forming apparatus comprising a rice tub-shaped container and a sushi ball-forming mechanism, the sushi ball-forming mechanism including a conveying mechanism disposed in a hopper in the rice tub-shaped container, for conveying sushi rice from an inside of the hopper, a compression-conveying mechanism for pushing up and compression-conveying the sushi rice supplied from the hopper, from a lower portion to an upper portion of the container, a compression-forming mechanism for compression-forming the sushi rice pushed up and compression-conveyed by the compression-conveying mechanism, into a predetermined shape through a forming hole; and a cutting mechanism for cutting the sushi rice compression-formed through the forming hole in a predetermined amount (length) to produce a sushi ball having a predetermined shape, size, and hardness.

According to the above construction, the sushi rice supplied from the hopper is compression-conveyed from the lower portion to the upper portion of the rice tube-shaped container, and then compression-formed into a predetermined shape through the forming hole, and further the compression-formed sushi rice is cut to a predetermined amount (length) by a pair of the shutters, which eliminates the need for a sushi ball-conveying means or e.g. a belt conveyer, thereby making the construction simple. All the sushi ball-forming mechanism is arranged inside the rice tub-shaped container while being combined in a rational manner, thereby miniaturizing the apparatus, facilitating the transfer and conveyance of the apparatus, and enabling the apparatus to be used in a narrow space, which enables the sushi balls to be taken out through the taking out portion of the upper portion of the rice tub-shaped container on forming the sushi balls to thereby prevent the sushi balls from losing their shape, and enables an amateur, having no experience of making hand-shaped sushi to take out the sushi balls from the rice tub-shaped container as it were a sushi artisan in appearance, to prevent the customers to be reluctant to resist the mechanization of shaping sushi balls.

Preferably, the rice tub-shaped container has a gap between an inner wall and an outer wall thereof, the gap being filled with a heat insulating material, thereby enabling the container to have a heat insulating function.

According to the above construction, the thermal insulation effect of the rice tub-shaped container enables the sushi rice compression-conveyed and compression-formed to be maintained at a predetermined temperature for a long time, which provides a constant and suitable sushi ball.

Further preferably, the conveying mechanism comprises a horizontal screw conveyer rotatably arranged in a lower center portion of the hopper having a substantially U-shaped bottom wall, and a pair of sushi rice-supporting and agitating blades, each of which having a rotational shaft and a screw blade formed around the rotational shaft with a predetermined gap, being arranged horizontally above the screw conveyer on both left and right sides thereof and rotatably inwardly in the directions opposite to each other, and formed spirally in the directions opposite to each other with a pitch larger than that of the screw conveyer.

According to the above construction, a pair of the sushi rice-supporting and agitating blades support the sushi rice, which prevents the sushi rice from directly dropping on to the screw conveyer in large quantities due to its own weight and causes the sushi rice to be sufficiently dispersed. Therefore, the screw conveyer is capable of always stably compression-conveying the sufficiently dispersed sushi rice to the compression-conveying mechanism in regular amounts, irrespective of the amount of the sushi rice in the hopper.

More preferably, the compression-conveying mechanism is comprised of a screw conveyer vertically arranged in a vertically longitudinal hole communicated with the inside of the hopper at a lower portion thereof, and rotating so as to push up the sushi rice from a lower portion to an upper portion of the vertically longitudinal hole.

According to the above construction, the conveyer shaft of the screw conveyer does not compression-convey the sushi rice, causing the hollow portion to be continuously formed at a center of the sushi rice compression-conveyed to the compression-forming mechanism arranged above, which provides the sushi ball having a soft feeling.

Advantageously, the compression-forming mechanism is comprised of a forming hole penetratingly formed on a forming block fixedly disposed on the compression-conveying mechanism, coaxially with the vertically longitudinal hole, and a taper hole formed on the forming block continuously with a lower end of the forming hole, and having a minimum diameter at an upper end thereof and a maximum diameter at a lower end thereof.

According to the above construction, the taper hole disposed on the lower portion of the forming hole gradually and smoothly compresses the sushi rice compression-conveyed from the lower portion of the upper portion of the vertically longitudinal hole, which makes the sushi ball homogeneous in compression density, shape, and hardness.

Also preferably, the cutting mechanism is comprised of a pair of shutters arranged on the forming block on both left and right sides of the forming hole movably so as to open and close the forming hole, and having recess curved surfaces on a proximal portion of a cutting blade at both upper and lower sides thereof, for compression-forming, when cutting the sushi rice, upper, lower, left and right corners of cut portions of the sushi rice roundly, respectively.

According to the above construction, when a pair of the left and right shutters close to cut a predetermined amount (length) of the sushi rice into the sushi ball, the hollow portion of the sushi rice is closed by the cutting surface, and hence is not exposed outside. Respective upper, lower, left and right corners of the cut portions are pressed inward by the recess curved surfaces to be made round, and the center portion is swelled like a substantially semicylinder, which can provide the sushi ball having the hollow portion only at a center portion thereof, and having a high quality and a good shape, and a soft feeling.

The operation of the rice tub-shaped sushi riceforming apparatus according to the present invention will be given us under.

When a switch is turned on, driving sources, or e.g. motors, of the conveying mechanism and the compression-conveying mechanism start, and hence the screw conveyer of the conveying mechanism is rotated in such a direction as to convey the sushi rice in the hopper toward the compression-mechanism. On the other hand, a pair of the sushi rice-supporting and agitating blades, being arranged horizontally above the screw conveyer on both left and right sides thereof and rotatably inwardly in the directions opposite to each other, and formed spirally in the directions opposite to each other the screw conveyer with a pitch larger than that of the screw conveyer. As a result, both the screw blades support the sushi rice in the hopper, which prevents the sushi rice from directly dropping on or being supplied to the screw conveyer due to its own weight, causes the sushi rice to be raked up and agitated from the outer portions to the upper inner portion of the hopper and then to be supplied, while being sufficiently dispersedly, to the screw conveyer at regular amounts through between the rotational shaft and the screw blades. In other words, the own weight of the sushi rice in the hopper is supported by a pair of the sushi rice-supporting and agitating blades, the sushi rice can be smoothly and stably weighed out and then conveyed to the compression-conveying mechanism irrespective of the amount of the sushi rice.

The sushi rice supplied from the hopper to the lower portion of the vertically longitudinal hole is, by means of the compression-conveying mechanism or the screw conveyer, compression-conveyed from the lower portion to the upper portion of the vertically longitudinal hole and then pushed in the taper hole of the compression-forming mechanism. The screw conveyer pushes up the sushi rice to the compression-forming mechanism arranged above, while the hollow space being inevitably continuously formed at a center of the sushi rice because the screw conveyer has the rotational shaft at a center thereof.

The compression-conveying mechanism continuously compression-conveys the sushi rice from the lower portion to the upper portion of the vertically longitudinal hole, during which the sushi rice is compression-formed to a predetermined shape through the forming hole disposed in the upper portion of the compression-forming mechanism and then pushed out to above. The sushi rice still has the hollow space which is, although not a perfect circle in section, deformed.

When the sushi rice is pushed out by a predetermined length from the forming hole, the sensor detects the sushi rice pushed out, and then the driving sources, or e.g. motors, receives the detected signal to start, and then closes a pair of the shutters, which has been in the open state through the driving mechanism, to thereby cut a predetermined amount (length) of the sushi rice, which provides the sushi ball having a predetermined shape and size.

When the sushi rice is cut by the recess curved surfaces disposed on the proximate portion of the cutting blade each of a pair of the shutters at both the upper and lower sides thereof, the upper, lower, left, and right corners of the cut portions of the sushi rice are made round, respectively, and the center portion of the sushi rice is swelled like a substantially semicylinder, which provides the sushi ball having a good shape.

The above and other objects, features, and advantages of the invention will be more apparent from the following detailed description taken in conjunction with the accompanying drawings.

DETAILED DESCRIPTION

The invention will be described in detail with reference to drawings showing a rice tub-shaped sushi ball-forming apparatus according to an embodiment of the invention.

Figure 1:
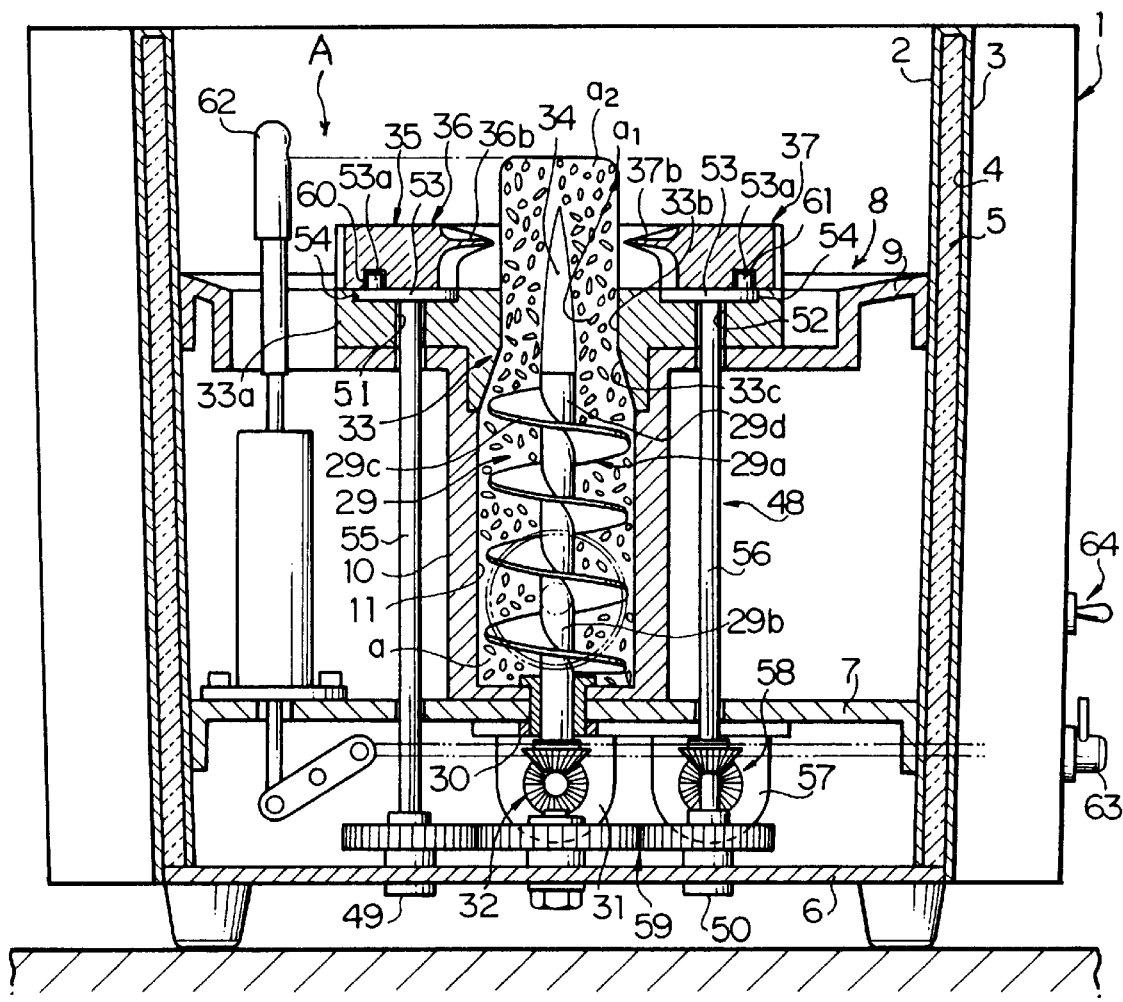
FIG. 1 is a vertical sectional view of a compression-conveying mechanism, a compression-forming mechanism, and a cutting mechanism in a rice tub-shaped sushi ball-forming apparatus according to an embodiment of the invention.
Figure 2:
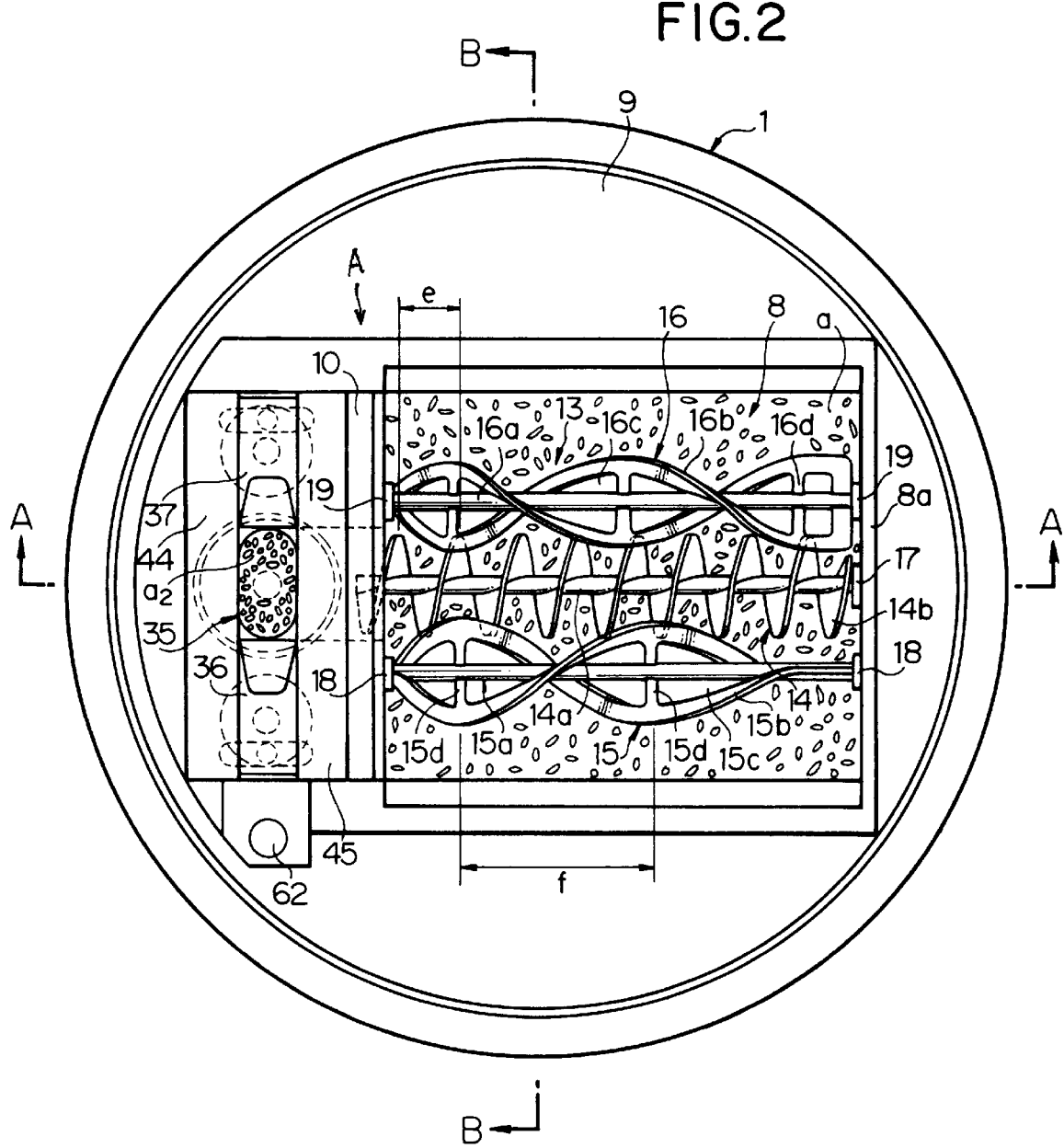
FIG. 2 is a plan view of the above-mentioned apparatus.
Figure 3:
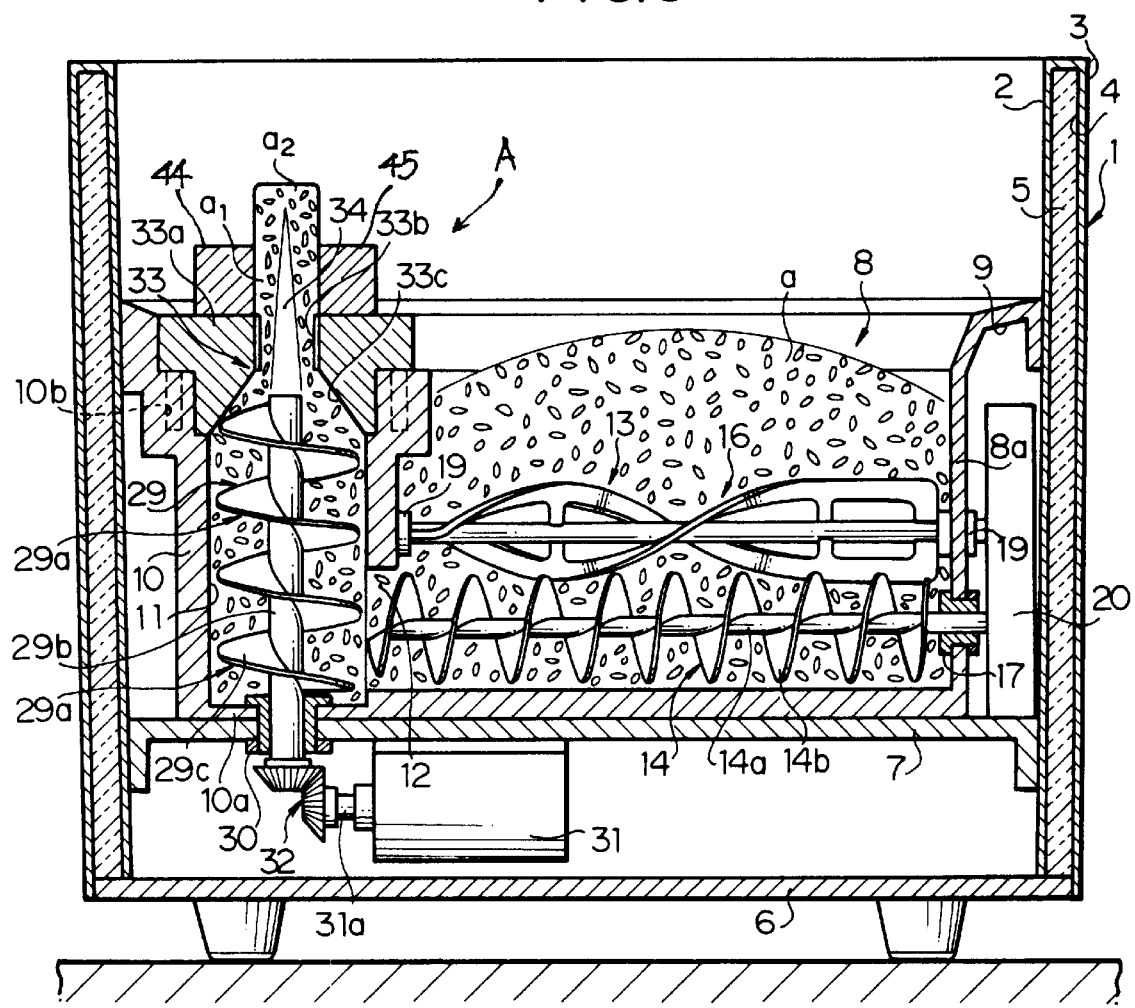
FIG. 3 is a sectional view taking on line A—A of FIG. 2.
Figure 4:
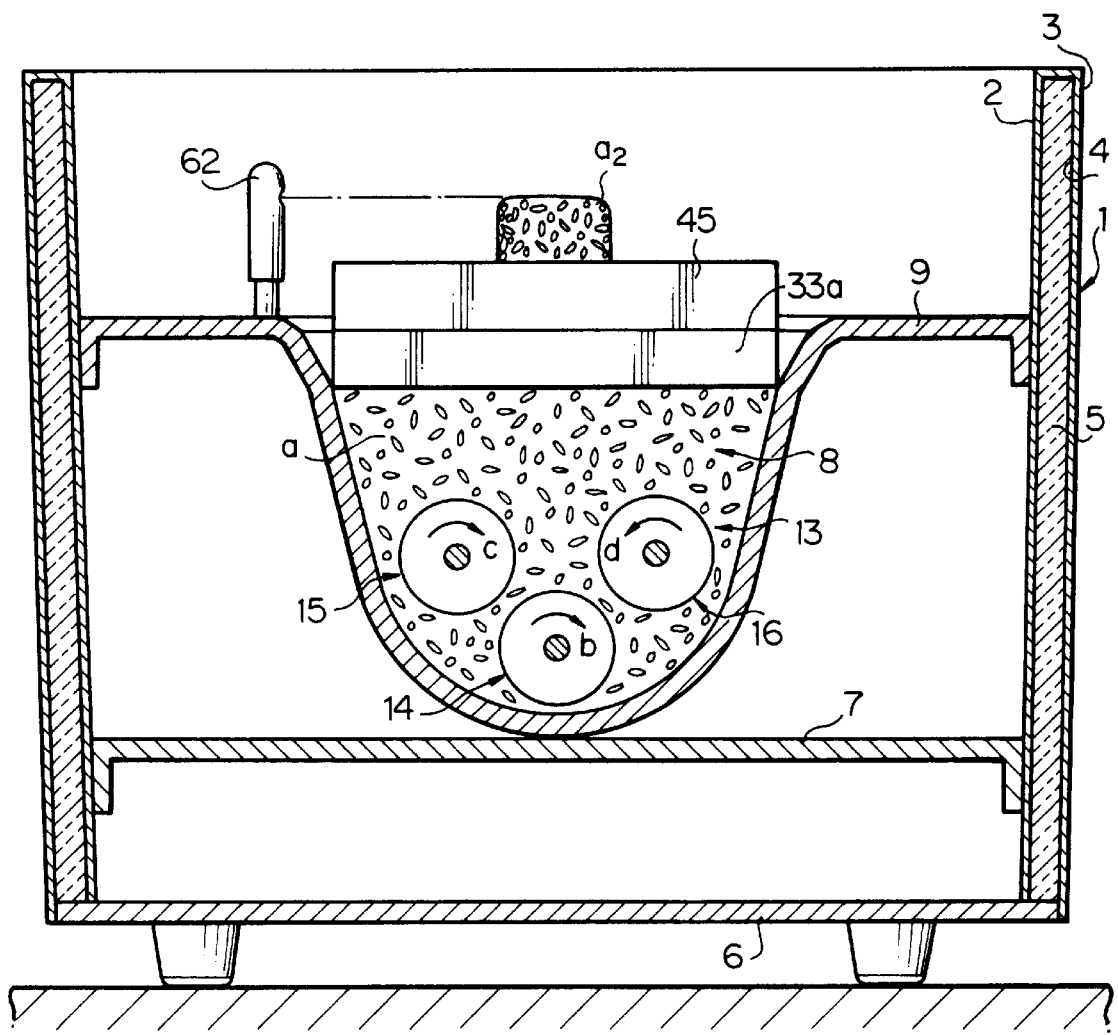
FIG. 4 is a sectional view taking on line B—B of FIG. 2.
Figure 5:
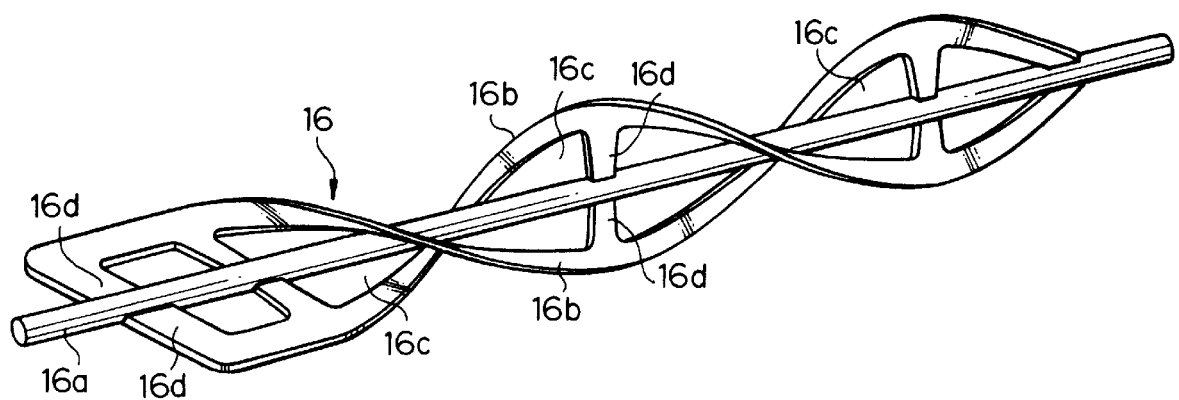
FIG. 5 is a perspective view a sushi rice-supporting and agitating blade in the compression-conveying mechanism of the above-mentioned apparatus.
Figure 6:
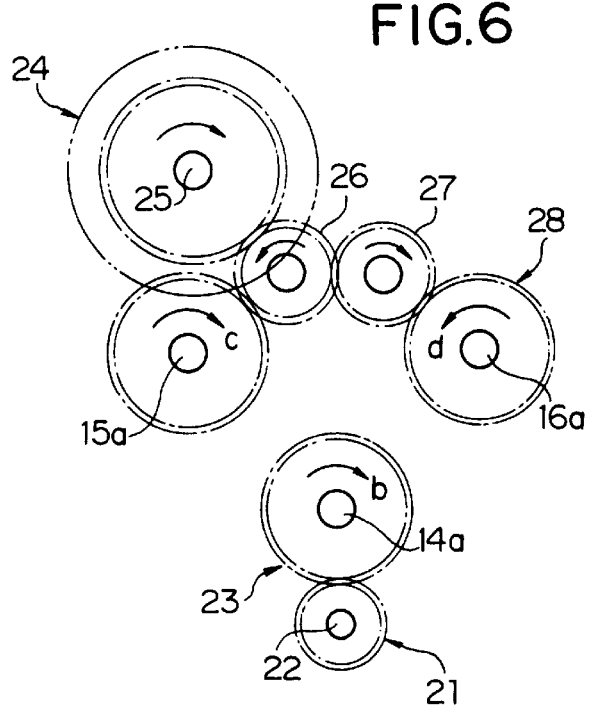
FIG. 6 is a front view of a gear transmission mechanism in the compression-conveying mechanism.
Figure 7:
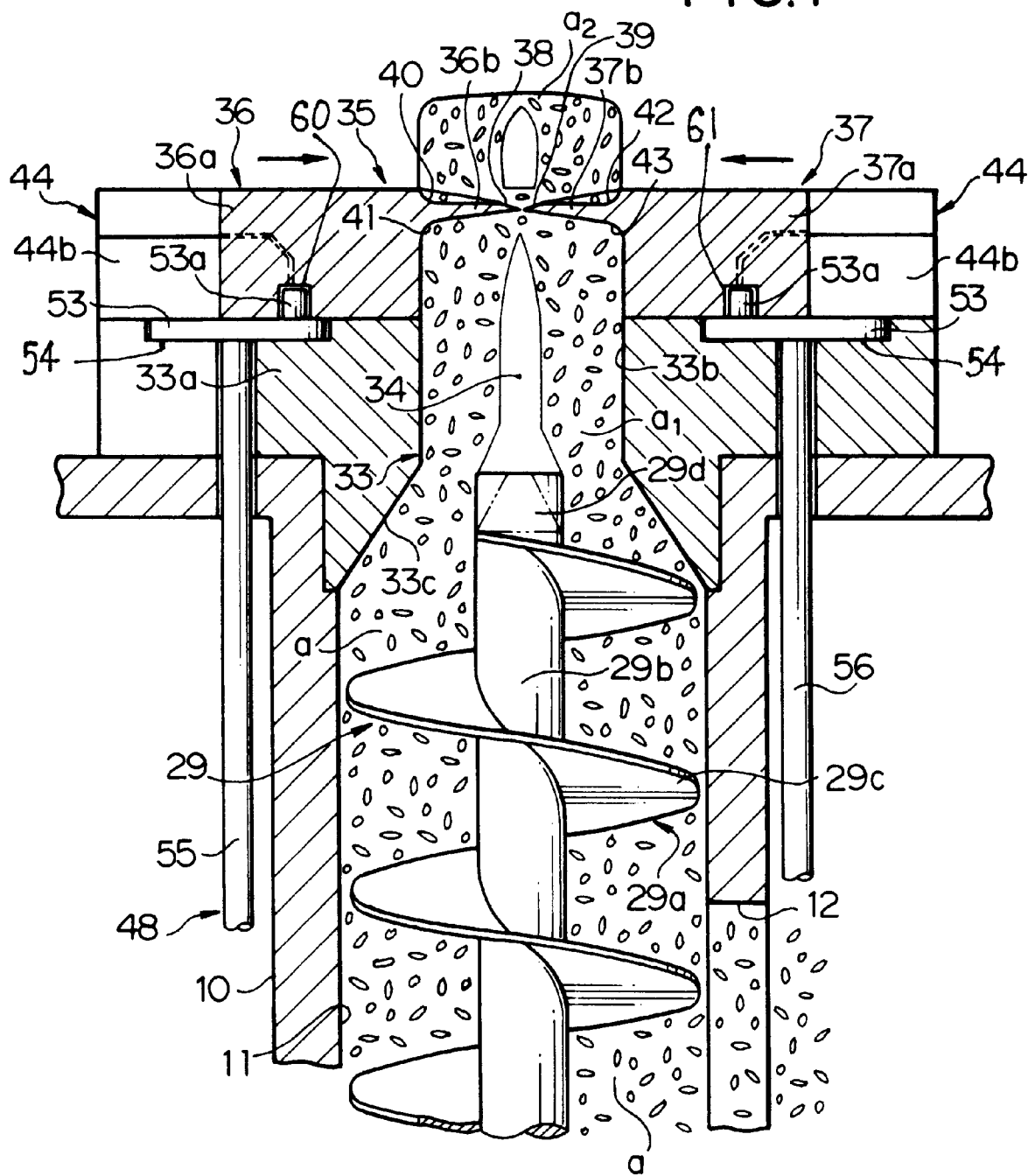
FIG. 7 is a part of the compression-conveying mechanism, the compression-forming mechanism, and the cutting mechanism of the above-mentioned apparatus.
Figure 8:
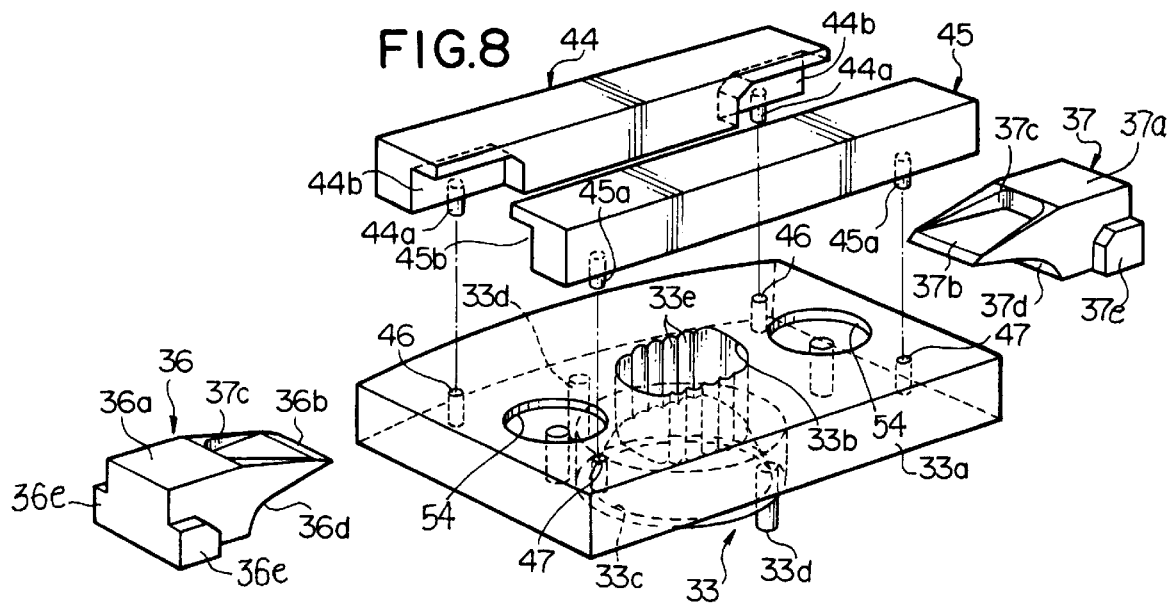
FIG. 8 is an exploded perspective view of the compression-forming mechanism and the cutting mechanism of the above-mentioned apparatus.
Figure 9:
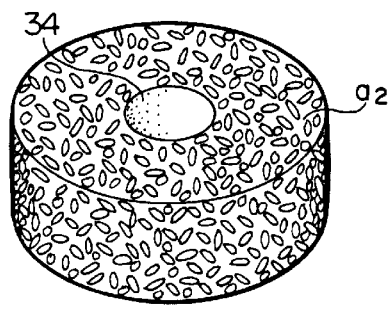
FIG. 9 is a perspective view of sushi rice, compression-formed in a taper hole of the compression-forming mechanism of the above-mentioned apparatus, which is cut to a predetermined length.
Figure 10:
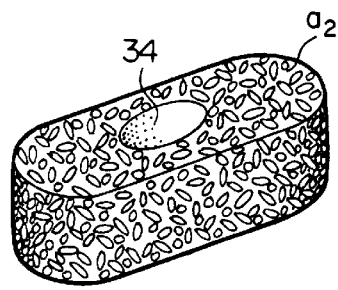
FIG. 10 is a perspective view of sushi rice, compression-formed in a forming hole of the compression-forming mechanism of the above-mentioned apparatus, which is cut to a predetermined length.
Figure 11:
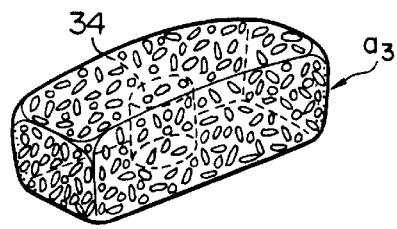
FIG. 11 is a perspective view of a sushi ball shaped by the above-mentioned apparatus.

FIG. 1 is a vertical sectional view of a compression-conveying mechanism, a compression-forming mechanism, and a cutting mechanism in a rice tub-shaped sushi ball-forming apparatus according to an embodiment of the invention; FIG. 2 is a plan view of the above-mentioned apparatus; FIG. 3 is a sectional view taking on line A—A of FIG. 2; FIG. 4 is a sectional view taking on line B—B of FIG. 2; FIG. 5 is a perspective view of a sushi rice-supporting and agitating blade in the compression-conveying mechanism of the above-mentioned apparatus; FIG. 6 is a front view of a gear transmission mechanism in the compression-conveying mechanism; FIG. 7 is a part of the compression-conveying mechanism, the compression-forming mechanism, and the cutting mechanism of the above-mentioned apparatus; FIG. 8 is an exploded perspective view of the compression-forming mechanism and the cutting mechanism of the above-mentioned apparatus, FIG. 9 is a perspective view of sushi rice, compressed in an initial state, which is cut to a predetermined length; FIG. 10 is a perspective view of sushi rice, compressed in an intermediate state, which is cut to a predetermined length; and FIG. 11 is a perspective view of a sushi ball.

As shown in FIGS. 1 to 3, a rice tub -shaped container 1 is comprised of an inner wall 2 and an outer wall 3 continuously connected to each other at upper ends thereof and spaced away from each other through a gap 4, a publicly known insulating material 5 filled in the gap 4, and a circular bottom wall 6. Moreover, the rice tub means a wooden container for containing cooked rice, which had been widely used in Japan. The rice tub-shaped container 1 is made of plastic and its external appearance is modeled after the rice tub.

The rice tub-shaped container 1 has a built-in sushi ball-forming mechanism A in such a manner that a sushi ball can be taken out through an upper portion of the container 1. A mechanism for attaching the sushi ball-forming mechanism A to the rice tub-shaped container 1 will be given as under.

A horizontal partition wall 7 is disposed in the rice tub-shaped container 1 and fixed thereto with a predetermined space above the bottom wall 6. Fixedly mounted on the partition wall 7 is a sushi rice-putting-in-service hopper 8 extending from a center portion to a rear portion of the rice tub-shaped container 1.

As shown in FIG. 4, the hopper 8 has a valley-shaped bottom at a center portion thereof. The valley-shaped bottom is bent like an arc with a radius of curvature slightly larger than that of a screw blade 14b of a screw conveyer 14, which are described hereinafter. Also, a top plate 9 extending from an upper opening portion of the hopper 8 is closely fitted in and fixed to an inside surface of the inner wall 2 of the rice tub-shaped container 1.

Further, as shown in FIGS. 1 to 3, a front portion (a left-hand side portion in FIG. 3) of the rice tub-shaped container 1 is thickened into a thick portion 10. The thick portion 10 has a vertically longitudinal hole 11 opening upward, and having a bottom wall 10a. The vertically longitudinal hole 11 is communicated with one side of a lower portion of the hopper 8 through a lateral hole 12 at one side of a lower portion thereof.

The hopper 8 has a sushi rice-conveying mechanism 13 arranged therein for conveying the sushi-rice a put in the hopper 8 to the lower portion of the vertically longitudinal hole 11.

The sushi rice-conveying mechanism 13 is, as shown in FIGS. 2 to 4, comprised of a horizontal screw conveyer 14 rotatably arranged in a lower center portion of the hopper 8, a pair of horizontal sushi rice-supporting and agitating blades 15, 16 rotatably arranged in parallel with the screw conveyer 14 with a space on both left and right sides thereof.

The screw conveyer 14 is, as shown in FIGS. 2 and 3, comprised of a conveyer shaft 14a and a screw blade 14b spirally formed around the conveyer shaft 14a. The conveyer shaft 14a is rotatably bore on a rear wall 8a of the hopper 8 by means of a bearing 17 at a rear end portion thereof, and inserted in the lateral hole 12 at a front end portion thereof.

A pair of the sushi rice-supporting and agitating blades 15, 16 each is, as shown in FIGS. 2, 3 and 6, comprised of a rotational shaft 15a, 16a, and a double-start screw blade 15b, 16b having two narrow band-like plates arranged around the rotational shaft 15a, 16a away therefrom with a predetermined gap 15c, 16c.

In other words, the screw blade 15b, 16b has a plurality of protruding pieces 15d . . . 16d . . . at regular intervals with respect to its longitudinal direction inside the two band-like plates constituting the screw blade 15b, 16b. The protruding pieces 15d . . . 16d . . . are fixed to the outer circumferential surface of the rotational shaft 15a, 16a at corresponding positions while being arranged spirally with a pitch f larger than a pitch e of the screw blade 14b on the screw conveyer 14, with the predetermined gap 15c, 16c formed between the rotational shaft 15a, 16a and the screw blade 15b, 16b.

Furthermore, the screw blades 15b, 15b, and the screw blades 16b, 16b of a pair of the sushi rice-supporting and agitating blades 15, 16 are bent in the directions opposite to each other as shown in FIG. 2. The screw conveyer 14 is rotated in a clockwise direction shown by the arrow b in FIG. 4, whereas a pair of the sushi rice-supporting and agitating blades 15, 16 are rotated, respectively, as shown by the arrows c, d in FIG. 4, i.e. the blade 15 is rotated in a clockwise direction, whereas the blade 16 is rotated in a counterclockwise direction in FIG. 4. As a result, the screw blades 15b, 15b or the screw blades 16a, 16b of a pair of the sushi rice-supporting and agitating blades 15, 16 support the sushi rice a, which prevents the sushi rice a from directly dropping on or being supplied to the screw conveyer 14 due to its own weight and causes only the sushi rice sufficiently dispersedly dropping through the distances 15c, 16c to be supplied to the screw conveyer 14 arranged therebelow, when a pair of the sushi rice-supporting and agitating blades 15, 16 rake up and agitate the sushi rice from the outer portions to the upper inner portion of the inside of the hopper 8.

Moreover, one of a pair of the sushi rice-supporting and agitating blades 15, 16 is rotated at a high speed and the other is rotated at a low speed.

Besides, in a pair of the sushi rice-supporting and agitating blades 15, 16, the rotational shafts 15a, 16a are, as shown in FIGS. 2 and 3, arranged horizontally and in parallel with each other, and supported on the thick portion 10 on a front side of the hopper 8 and on the rear wall 8a through bearings 18, 18, 19, 19 at both end portions thereof.

The screw conveyer 14 is rotated in the direction shown by the arrow b in FIG. 7, because the conveyer shaft 14a is engaged with a drive shaft 22 of a motor 21 by a gear transmission mechanism 23, shown in FIG. 7, which are disposed in a gear case 20 shown in FIG. 3.

A pair of the sushi rice-supporting and agitating blades 15, 16 are rotated in the directions shown by the arrows c, d in FIG. 7, because the rotational shafts 15a, 16a are engaged with a drive shaft 24 of a motor 24 by a gear transmission mechanism 28 including two intermediate gears 26, 27 engaged with each other.

As shown in FIGS. 1 and 3, arranged in the vertically longitudinal hole 11 is a compression-conveying mechanism 29 for compression-conveying the sushi rice a supplied from the hopper 8 through the lateral hole 12, from a lower portion to an upper portion of the hole 11.

The compression-conveying mechanism 29 is comprised of a screw conveyer 29a which comprises a conveyer shaft 29b and a screw blade 29c formed around the screw shaft 29b. The conveyer shaft 29b is arranged vertically in the vertically longitudinal hole 11 and rotatably bore on the bottom wall 10a of the thick portion 10 and the partition plate 7 through a bearing 30. A lower end portion of the conveyer shaft 29b protruding downward from the bottom wall 10a and the partition plate 7 is engaged with a drive shaft 31a of a motor 31, which is arranged in a space between the partition plate 7 and the bottom wall 6, by a gear transmission mechanism 32, thereby causing the screw conveyer 29a to be rotated in a clockwise direction viewed from below, which causes the sushi rice a to be compression-supplied from the lower portion to the upper portion of the hole 11.

An upper end portion 29d of the conveyer shaft 29 has the same diameter as the lower end portion thereof as shown by the actual line in FIG. 5, or is shaped like a taper as shown by the two-dotted line in FIG. 5.

Forming the upper end portion 29d of the conveyer shaft 29b as described above prevents, when the screw conveyer 29a conveys the sushi rice a from the lower portion to the upper portion of the hole 11, the conveyer shaft 29b from compression-conveying the sushi rice a, thereby causing a hollow portion 34 to be continuously formed, as shown in FIGS. 1, 3, 5, 9, and 10 at a center portion of the compression-formed sushi rice $a_1$, or on an upward extension of the upper end portion 29d of the conveyer shaft 29b.

As shown in FIGS. 1, 3, and 5, disposed on the compression-conveying mechanism 29 is a compression-forming mechanism 33 of the sushi rice a.

The compression-forming mechanism 33 is, as shown in FIGS. 1, 3 and 5, comprised of a forming block 33a detachably fixed on to the thick portion 11 on the front portion of the hopper 8 having the vertically longitudinal hole 11, a forming hole 33b penetratingly formed on an upper center portion of the forming block 33a and having the same shape as a sushi ball to be formed, and a taper hole 33c formed below the forming hole 33b continuously from a lower end of the forming hole 33b.

The taper hole 33c has an upper end, of which size is identical with the two axis direction-wise dimension of the lower end of the forming hole 33b, and is gradually diameter-enlarged toward a lower end thereof, of which size is identical with an inner diameter of the vertically longitudinal hole 11. When pushing up the sushi rice a through the taper hole 33c from below, the sushi rice a is gradually pushed into the forming hole 33b located above while being compressed smoothly, whereby a compression-formed sushi rice $a_1$, having a predetermined shape, is formed by the forming hole 33b, and then pushed out upward through the forming hole 33b.

The forming block 33a has, as shown in FIG. 8, a plurality (two in this embodiment) of fixing pins 33d, 33d downwardly protruding, at a lower face thereof. Fixing the pins 33d, 33d to recess holes 10b, 10b formed on an upper surface of the thick portion 10 causes the forming block 33a to be detachably fixed to the upper surface of the thick portion 10.

As shown in FIG. 8, a plurality of sushi rice-guiding recess grooves 33e . . . are disposed on longer axis direction-wise surfaces of the forming hole 33b opposite to each other. This causes the sushi rice a to enter into the recess grooves 33 . . . , which prevents the sushi rice a from twisting when the sushi rice a is compression-conveyed while being rotated by the screw conveyer 29a of the compression-conveying mechanism 29. This enables the sushi rice a to be smoothly pushed up and compression-conveyed, which enables the compression-formed sushi rice $a_1$ to favorably have a good shape.

As shown in FIGS. 1, 2, and 5, disposed on the upper portion of the compression-forming mechanism 33 is a cutting mechanism 35 for cutting an upper end $a_2$ of the compression-formed sushi rice down to a predetermined length to form a sushi ball $a_3$ shown in FIG. 11.

The cutting mechanism 35 is, as shown in FIGS. 1, 5 and 8, comprised of a pair of shutters 36, 37.

The shutter 36, 37 is, as shown in FIGS. 1, 5, and 8, comprised of a block-like main body 36a, 37a, a thin cutting blade 36b, 37b extending forward from the main body 36a, 37a, and concave curved surfaces disposed on the proximate portion of the cutting blade 36a, 37a at upper and lower surfaces thereof, for compression-forming, when cutting the upper end $a_2$ of the compression-formed sushi rice, respective upper, lower, left and right corner portions 40, 41, 42, 43 of the cut portions 38, 39, as shown in FIG. 7.

A pair of front and rear shutter-service guide blocks 44, 45 extending in one axial direction are, as shown in FIGS. 3 and 8, fixed on to the upper surface of the forming block 33a on both sides of the forming hole 33b, by detachably fitting a plurality of fixing pins 44a, 44a, 45a, 45a protruding downward from the lower surface thereof to a plurality of recess holes 46, 46, 47, 47 formed on the upper surface of the forming block 33*a*.

The guide blocks 44, 45 has guide grooves 44*b*, 45*b* at both end portions thereof with respect to the longitudinal direction, and the main body 36*a*, 37*a* has protruding portions 36*e*, 37*e* at both side surfaces of a rear portion thereof. Slidably fitting the protruding portions 36*e*, 37*e* in the guide grooves 44*b*, 45*b* enables a pair of the shutters 36, 37 to move between the guide blocks 44, 45 so as to close and open the forming hole 33*b* in association with each other.

As shown in FIG. 5, a pair of the shutters 36, 37 cut the upper end $a_2$ of the compression-formed sushi rice pushed out upward through the forming hole 33*b*, thereby causing the cut portions 38, 39 to be pushed and compressed inward, to thereby form a cut surface on the end portion $a_2$, which causes the hollow portion 34 at a center of the upper end $a_2$ of the compression-formed sushi rice to be closed. The hollow portion 34 is not exposed outside to thereby be formed only inside the upper end $a_2$ as shown in FIG. 11, which provides a sushi ball $a_3$ having a soft feeling.

Furthermore, when the upper, lower, left ands 40, 41, 42, 43 of the cut portions 38, 39 are compression-formed roundly, respectively, the upper end $a_2$ of the compression-formed sushi rice is compressed and cut inward from both left and right sides thereof with respect to the longitudinal direction, thereby causing the upper surface to be, as shown in FIG. 11, swelled like a substantially semicylinder, which enables the sushi ball $a_3$ to have a good shape in cooperation with a fact that the respective corner portions 40 to 43 are compression-formed roundly.

A driving mechanism 48 for opening and closing a pair of the shutters 36, 37 is constructed as follows:

As shown in FIG. 1, the driving mechanism 48 is comprised of a pair of left and right rotational shafts 55, 56, and a motor 57. The rotational shafts 55, 56, each of which having an upper end to which is fixed a disk 53 having an eccentric pin 53*a* at an upper surface thereof, are rotatably bore on the bottom wall 6 of the rice tub-shaped container 1 through bearings 49, 50 at lower ends thereof and penetrate through holes 51, 52 penetratingly disposed in the forming block 33*a* at an upper portion thereof, the disks 53 being rotatably fitted in recess holes 54, 54 formed on the upper surface of the forming block 33*a*. Any one of a pair of the rotational shafts 55, 56, more specifically, the rotational shaft 56 in this embodiment is connected to a driving shaft, not shown, of the motor 57 by means of the gear transmitting mechanism 58, and both the rotational shafts 55, 56 are connected to each other by the gear transmission mechanism 58 in such a manner that a pair of the rotational shafts 55, 56 are rotated in directions opposite to each other.

The eccentric pin 53*a*, 53*a* of the disc 52, 53 is, as shown in FIGS. 1 and 5, slidably engaged with a guide hole 60, 61 disposed on a back surface of the shutter 36, 37 and extending in a direction perpendicular to the opening and closing direction of the shutters 36, 37. The opposed direction-wise rotations of the respective discs 53, 53 causes a pair of the shutters 36, 37 to move so as to close, as shown in FIG. 5, from an open state shown in FIG. 1, to thereby cut the upper end $a_2$ of the compression-formed sushi rice, which provides the sushi ball $a_3$ shown in FIG. 11. Moreover, when a pair of the shutters 36, 37 open again as shown in FIG. 1 from a closed state shown in FIG. 5, the upper end $a_2$ of the compression-formed sushi rice is pushed out through the forming hole 33*b*.

As shown in FIG. 1, a sushi rice-detecting sensor 62 is disposed at one side of the rice tub-shaped container 1, for detecting a pressing length of the upper end $a_2$ of the compression-formed sushi rice pushed out through the forming hole 33*b*. The motor 57 starts to move on receiving the detected signal to thereby close a pair of the shutters 36, 37.

The sensor 62 is moved in up and down directions by rotating normally and reversely an adjusting knob 63, to thereby change voluntarily the length of the upper end $a_2$ of the compression-formed sushi rice pushed out.

Moreover, in FIG. 1, reference numeral 64 designates an on-off switch for the sushi ball-forming apparatus A.

What is claimed is:

1. A rice tub-shaped sushi ball-forming apparatus comprising a rice tub-shaped container and a sushi ball-forming mechanism, said sushi ball-forming mechanism including:
 a conveying mechanism disposed in a hopper in said rice tub-shaped container, for conveying sushi rice in the lateral direction from an inside of said hopper;
 a compression-conveying mechanism for pushing up and compression-conveying said sushi rice supplied from said hopper, from a lower portion to an upper portion of said container;
 a compression-forming mechanism for compression-forming said sushi rice pushed up and compression-conveyed by said compression-conveying mechanism, into a predetermined shape through a forming hole; and
 a cutting mechanism for cutting said sushi rice compression-formed through said forming hole to a predetermined amount to make a sushi ball having a predetermined shape, size, and hardness.

2. A rice tub-shaped sushi ball-forming apparatus as claimed in claim 1, wherein said rice tub-shaped container has a gap between an inner wall and an outer wall thereof, said gap being filled with a heat insulating material, thereby enabling said container to have a heat insulating function.

3. A rice tub-shaped sushi ball-forming apparatus as claimed in claim 1, wherein said conveying mechanism comprises a horizontal screw conveyer rotatably arranged in a lower center portion of said hopper having a substantially U-shaped bottom wall, and a pair of sushi rice-supporting and agitating blades, each of which having a rotational shaft and a screw blade formed around said rotational shaft with a predetermined gap, being arranged horizontally above said screw conveyer on both left and right sides thereof and rotatably inwardly in the directions opposite to each other, and formed spirally in the directions opposite to each other with a pitch larger than that of said screw conveyer.

4. A rice tub-shaped sushi ball-forming apparatus as claimed in claim 1, wherein said compression-conveying mechanism is comprised of a screw conveyer vertically arranged in a vertically longitudinal hole communicated with said inside of said hopper at a lower portion thereof, and rotating so as to push up said sushi rice from a lower portion to an upper portion of said vertically longitudinal hole.

5. A rice tub-shaped sushi ball-forming apparatus as claimed in claim 4, wherein said compression-forming mechanism is comprised of a forming hole penetratingly formed on a forming block fixedly disposed on said compression-conveying mechanism, coaxially with said vertically longitudinal hole, and a taper hole formed on said forming block continuously with a lower end of said forming hole, and having a minimum diameter at an upper end thereof and a maximum diameter at a lower end thereof.

6. A rice tub-shaped sushi ball-forming apparatus as claimed in claim 1, wherein said cutting mechanism is comprised of a pair of shutters arranged on said forming block on both left and right sides of said forming hole movably so as to open and close said forming hole, and having recess curved surfaces on a proximal portion of a cutting blade at both upper and lower sides thereof, for compression-forming, when cutting said sushi rice, upper, lower, left and right corners of cut portions of said sushi rice roundly, respectively.

* * * * *

UNITED STATES PATENT AND TRADEMARK OFFICE
CERTIFICATE OF CORRECTION

PATENT NO. : 6,053,097
DATED : April 25, 2000
INVENTOR(S) : Kisaku SUZUKI

It is certified that error appears in the above-identified patent and that said Letters Patent is hereby corrected as shown below:

ON THE TITLE PAGE:

After item [22] Add --[30]

Foreign Application Priority Data:

Japan Application No. 11-99651 filed April 7, 1999

Signed and Sealed this

Sixth Day of March, 2001

Attest:

NICHOLAS P. GODICI

Attesting Officer     Acting Director of the United States Patent and Trademark Office